United States Patent [19]

Hartness

[11] Patent Number: 5,220,569
[45] Date of Patent: Jun. 15, 1993

[54] DISK ARRAY WITH ERROR TYPE INDICATION AND SELECTION OF ERROR CORRECTION METHOD

[75] Inventor: Carl B. Hartness, Eau Claire, Wis.

[73] Assignee: Seagate Technology, Inc., Scotts Valley, Calif.

[21] Appl. No.: 550,734

[22] Filed: Jul. 9, 1990

[51] Int. Cl.[5] .............................................. G06F 11/00
[52] U.S. Cl. ........................................ 371/37.7; 371/7
[58] Field of Search ................. 371/37.7, 37.4, 37.1, 371/38.1, 39.1, 5, 10.1, 10.2, 21.1, 40.1, 7

[56] References Cited

U.S. PATENT DOCUMENTS

| | | | |
|---|---|---|---|
| 3,836,957 | 9/1974 | Duke et al. | 340/146.1 |
| 4,445,216 | 4/1984 | Kobari et al. | 371/37.7 |
| 4,494,234 | 1/1985 | Patel | 371/38 |
| 4,525,838 | 6/1985 | Patel | 371/37 |
| 4,598,357 | 7/1986 | Swenson et al. | 364/200 |
| 4,608,688 | 8/1986 | Hansen et al. | 371/11 |
| 4,651,321 | 3/1987 | Woffinden et al. | 371/38 |
| 4,680,764 | 7/1987 | Suzuki et al. | 371/37.7 |
| 4,706,250 | 11/1987 | Patel | 371/39 |
| 4,722,085 | 1/1988 | Flora et al. | 371/38 |
| 4,761,785 | 8/1988 | Clark et al. | 371/51 |
| 4,775,978 | 10/1988 | Hartness | 371/38 |
| 4,780,809 | 10/1988 | Woffinden et al. | 364/200 |
| 4,817,035 | 3/1989 | Timsit | 364/900 |
| 4,833,679 | 5/1989 | Anderson et al. | 371/38 |
| 4,843,607 | 6/1989 | Tong | 371/38.1 |
| 4,849,929 | 7/1989 | Timsit | 364/900 |

Primary Examiner—Robert W. Beausoliel, Jr.
Assistant Examiner—Phung M. Chung
Attorney, Agent, or Firm—Kinney & Lange

[57] ABSTRACT

A data recovery channel for a fault tolerant data storage system. The data storage system includes a plurality of disk drives and an input interface formatting the data records for storage among the disk drives. Stored data is organized into sectors and rows of sectors, sectors including error correction codes for the sector, and rows including sectors of parity data for the sectors of the row. Upon readback, the data recovery channel preferentially operates on parity data for error correction over utilization of error syndromes generated from the error correction codes for error correction, though both remain available. Absent an indication that an error is contained in more than one sector for a row of sectors, correction of error in the defective sector is made by use of parity information. Where error is indicated for more than one sector in a row of sectors, correction using the error syndromes is attempted, sector by sector, until the number of sectors in the row having error is reduced to one. Parity is used to correct the remaining defective sector.

8 Claims, 2 Drawing Sheets

DISK ARRAY WITH ERROR TYPE INDICATION AND SELECTION OF ERROR CORRECTION METHOD

BACKGROUND OF THE INVENTION

The invention relates generally to an apparatus and method for correcting data recovered from a peripheral data storage system in a data processing system. The invention more particularly relates to correction of data files recovered from disk drive arrays.

A peripheral data storage system is a type of secondary memory accessible by a data processing system, such as a computer. Memory, in a computer, is where programs and work files are stored as digital data. Computer memory can include either, and commonly includes both, moving-type memory and non-moving type memory. Non-moving memory is typically directly addressed by the computer's central processing unit. Moving memory, such as magnetic disk drives and magnetic tape, is not directly addressed, and is commonly referred to as secondary memory or peripheral memory.

Moving memory typically has much greater data storage capacity than directly addressed memory and has much longer access times. Moving memory is also typically not volatile. That is, it survives turning the computer off. Non-moving type memory is typically faster and more expensive per unit of memory than moving-type memory, and has less capacity. Moving-type memories are generally used for long-term storage of large programs and substantial bodies of information, such as a data base files, which are not in constant use by the computer, or which are too bulky to provide short term direct access memory capacity for.

The storage media of the moving-type memory are physically alterable objects. That is to say, they can be magnetized, grooved, pitted or altered in some detectible fashion to record information. Preferably the storage media is at the same time physically resilient, portable, cheap, of large capacity, and resistant to accidental alteration. An example of an analogous medium is a phonograph record where a wavy spiral groove represents an analog information signal. The various species of storage media used in moving-type memory for computers include magnetic tape, floppy disks, compact disk-ROM, Write-Once, Read-Many optical disks and, most recently, erasable magneto-optic disks. Each of these storage media exhibit detectable physical changes to the media representing binary data. To read, and where applicable to erase and write data to the media, mechanical apparatuses are provided which can be directed to the proper location on the physical media and carry out the desired function.

A magnetic disk drive includes a transducer, a magnetic media disk and associated electronic circuitry to drive or monitor the transducer and transfer the data between the physical medium and the computer to which the drive is connected. The conversion of data from electronic signal to physical feature for storage, extended retention of the data as physical features, and the conversion of physical feature back to electronic signal offers numerous opportunities for error to be introduced to the data record. Transducer and disk present to one another surfaces that are in essentially constant motion. While the interaction between transducer and media is magnetic, the interaction between their surfaces is a mechanical one, affected over time by factors such as friction, wear, media flaking and collisions between the transducer and the media. All of these occurrences can be sources of error. In addition, both individual transducers and magnetic media surfaces are subject to failures, such as opening of a transducer electromagnet winding or imperfections in the magnetic media surface. Mechanical failure can affect the magnetic interaction of the transducer and the media, and consequently can affect the ability of data recovery circuitry to read data records from the media surface. The faults described above, and others too numerous to discuss in any detail here, can result in loss of data records ranging from one bit to all of the data of the record stemming from failure of an entire drive. The possibility of error in readback, and error or loss of data on the disk, has led to the incorporation of error detection and correction techniques in disk drives.

Data in digital processing systems is typically stored to a disk drive by sectors. Such sectors will include certain redundant information to be used for checking the accuracy of the record and possible correction of the sector upon readback. An example of such redundant information is "Error Checking and Correcting Code", sometimes referred to as "Error Correction Code" or "ECC".

An Error Correction Code for a sector or record will literally comprise data bits supplementing the regular data bits of the record. Where ECC is used each record conforms to specific rules of construction which permit use of the supplemental bits to detect and, under certain circumstances, correct errors in the record. In actual use, error syndromes are generated from data and the ECC upon readback of the sector. Non-zero error syndromes indicates that error is present. Where error is "random", which for purposes of this patent means error within the capacity of the ECC to correct, the error syndromes can be used to correct the sector. However, operation on the error syndromes to correct error is relatively time consuming in terms of performance of the disk drive in a computer. Analysis of the error syndromes to determine whether error is correctable, that is whether error is random or massive, can be done in a relatively short period of time.

A second example of redundant data is parity data. Parity data is generated for a logically associated group of binary bits, typically by a modulo addition operation on the group to generate a check digit. An example of a check digit in a binary system is where the digits are logically "ORed", generating a "1" if the number of "1's" in the group is odd or a "0" otherwise. Parity, absent information indicating location of an error, is usable only to identify the existence of error. However, given independent identification of location of the error in a group, the use of parity permits rapid correction of the error. Only one bit of error per parity bit can be corrected.

A computer can use more than one disk drive for the storage of data. Alternatively, a plurality of disk drives can be organized to operate together and thereby appear to the computer as one peripheral storage unit. The term disk drive array is used in this patent to indicate a group of disk drives operating in a parallel, synchronous fashion allowing transfer of data bits of record in parallel to the individual drives of the array and appearing to the computer as a single, data storage peripheral device. An interface operating between the disk drive array and the data processing system transfers data to and from storage in parallel to increase data transmission bandwidth.

Such parallel, synchronized disk drives have characteristics offering opportunity for improvement in redundancy for stored data. Simplistically, data on one disk drive can be mirrored on another. In U.S. Pat. No. 4,775,978, assigned to the present assignee, the present inventor taught a "Data Error Correction System" for a mass data storage system comprising an array of synchronized disk data storage units. U.S. Pat. No. 4,775,978 is expressly incorporated herein by reference. The data storage system receives data blocks from a host data processing system for storage. A data block divider stripes the data among a plurality of the disk data storage units as columns. A data word is divided among the plurality of disk drives one bit to each drive. Data stored to the same address on each disk are supplemental by a column of parity data stored to yet another data storage unit. Each data column, assigned to a particular disk drive, is supplemented with an error correction code. Upon readback, two levels of data error correction are provided. Data columns are read and stored to buffers. Error syndromes are generated upon readback and used to correct random error. When a data storage unit fails, or where error correction code for a column is inadequate to correct errors in a column, the column (i.e. data storage unit) where the error occurs is identified and the parity data in combination with the data of the other columns is used to reconstruct data in the missing column. The system provides a highly fault tolerant data storage system.

SUMMARY OF THE INVENTION

The subject invention is an improved data recovery channel applicable to a data error correction system such as that taught by U.S. Pat. No. 4,775,978. The data recovery channel preferentially operates on parity data for error correction over utilization of error syndromes for error correction, though both remain available. In summary, absent indication of errors from more than one sector for a row of sectors, correction of error in the defective sector is made by use of parity information. Where error is indicated for more than one sector in a row of sectors, correction using the error syndromes is attempted, sector by sector, until the number of sectors in the row having error is reduced to one. Parity is used to correct the remaining defective sector.

Error syndromes are generated for each sector upon recovery of the sector from a disk drive. A non-zero error syndrome set for a sector indicates the possible presence of error and results in generation of a signal indicating such occurrence. A failure to recover a sector results in generation of a signal indicating a drive fault. A status buffer saves indications of fault from a failing drive, the occurrence of non-zero error syndromes or an error-free condition for each recovered sector. An error syndrome buffer retains the error syndromes if non-zero.

An array controller monitors the status buffer and continues the read operation as long as no more than one drive fault is indicated with respect to a row of data sectors. Upon completion of reading of all the rows of a file, the data recovery channel has access to the sector status information, the recovered data sectors and to the error syndromes. Error correction of the sectors, reconstruction of the original data words and transmission out of the original record is then attempted.

The array controller interrogates the sector status information and either executes, or directs execution, of error correction routines to restore the original data. Utilization of the error syndromes for data reconstruction is deferred in favor of parity reconstruction if errors occur in only one sector for each row of sectors.

Error status for each sector is retained in an error status buffer. Where the status buffer indicates no errors for a row, the original data words are reconstructed and the data transmitted to the utilizing computer. Where error of either type is indicated for one sector of a row, parity is used to reconstruct the affected sector. Upon indication of error for more than one sector of a row, the array controller attempts restoration of the defective sectors of the row utilizing error syndrome data. The array controller or syndrome processing circuitry, which may be a program executed by the array controller, operates on the error syndromes for a first defective sector from the row to determine if the sector is correctable. If the sector is correctable, correction is carried out, the restored data is stored to the data buffer and the error status buffer for the sector is reset. Once the number of sectors in a row with error of either type is reduced to one, parity correction is done and the entire row is transferred out to the utilizing computer. Where the number of sectors in a row with error cannot be reduced below two using error syndromes, the read operation is interrupted and the more extensive data recovery methods, directed at the effected disk drives are attempted, e.g. a reread of disk drives.

DETAILED DESCRIPTION OF THE PREFERRED EMBODIMENTS

Figure 1:
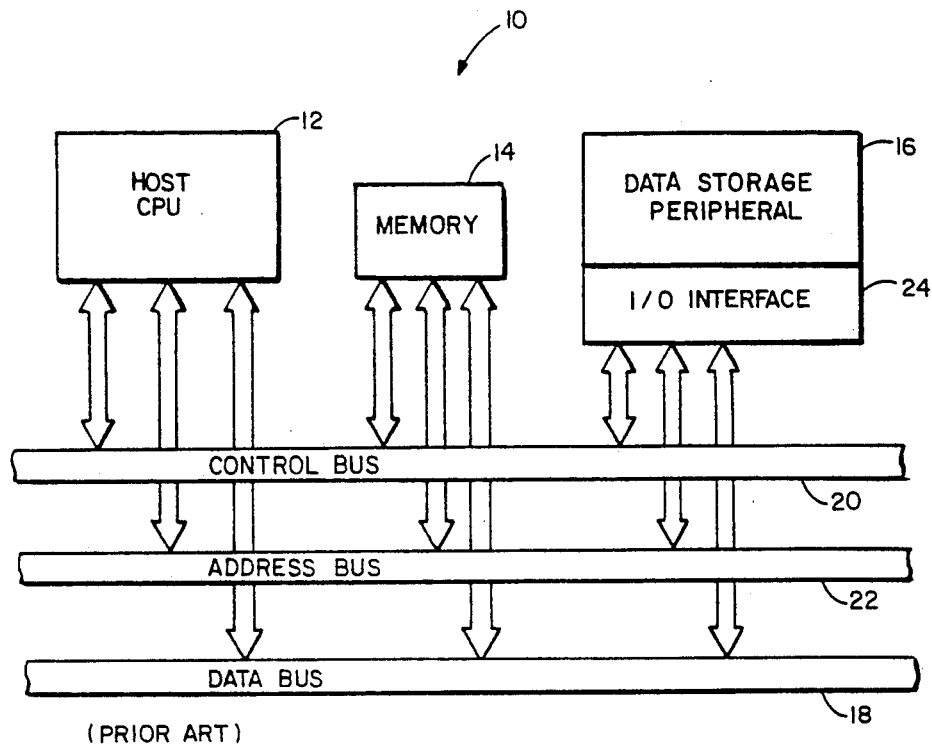
FIG. 1 is a block diagram of an exemplary prior art data processing system.

FIG. 1 illustrates a prior art data processing system 10 with which the present invention can be advantageously used. The description of the architecture of data processing system 10 is intended only to give an environment for explanation of the invention and is not intended as a description of a particular computer architecture with which the invention is used. Data processing system 10 is entirely conventional and includes a central processing unit 12, a direct access memory 14 and a data storage peripheral 16. Central processing unit 12 stores data and programming steps to and recovers data and programming steps over data bus 18 from memory 14 and data storage peripheral 16. Data storage peripheral 16 can transfer data and programming steps over bus 18 directly to memory 14 or to central processing unit 16.

Central processing unit 12 exercises control over memory 14 and data storage peripheral 16 over control bus 20 and address bus 22, thereby directing the timing of the transfer of data and locations to which the data is delivered or from which it is called. Data storage peripheral 16 could be a tape drive, a disk drive, or some other form of indirectly addressed, mass data storage structure. Communication between peripheral 16 and the rest of data processing system 10 is through an input/output interface 24. Where data storage peripheral 16 is an array of disk drives, the data recovery channel of the present invention can be advantageously incorporated in interface 24.

Figure 2:
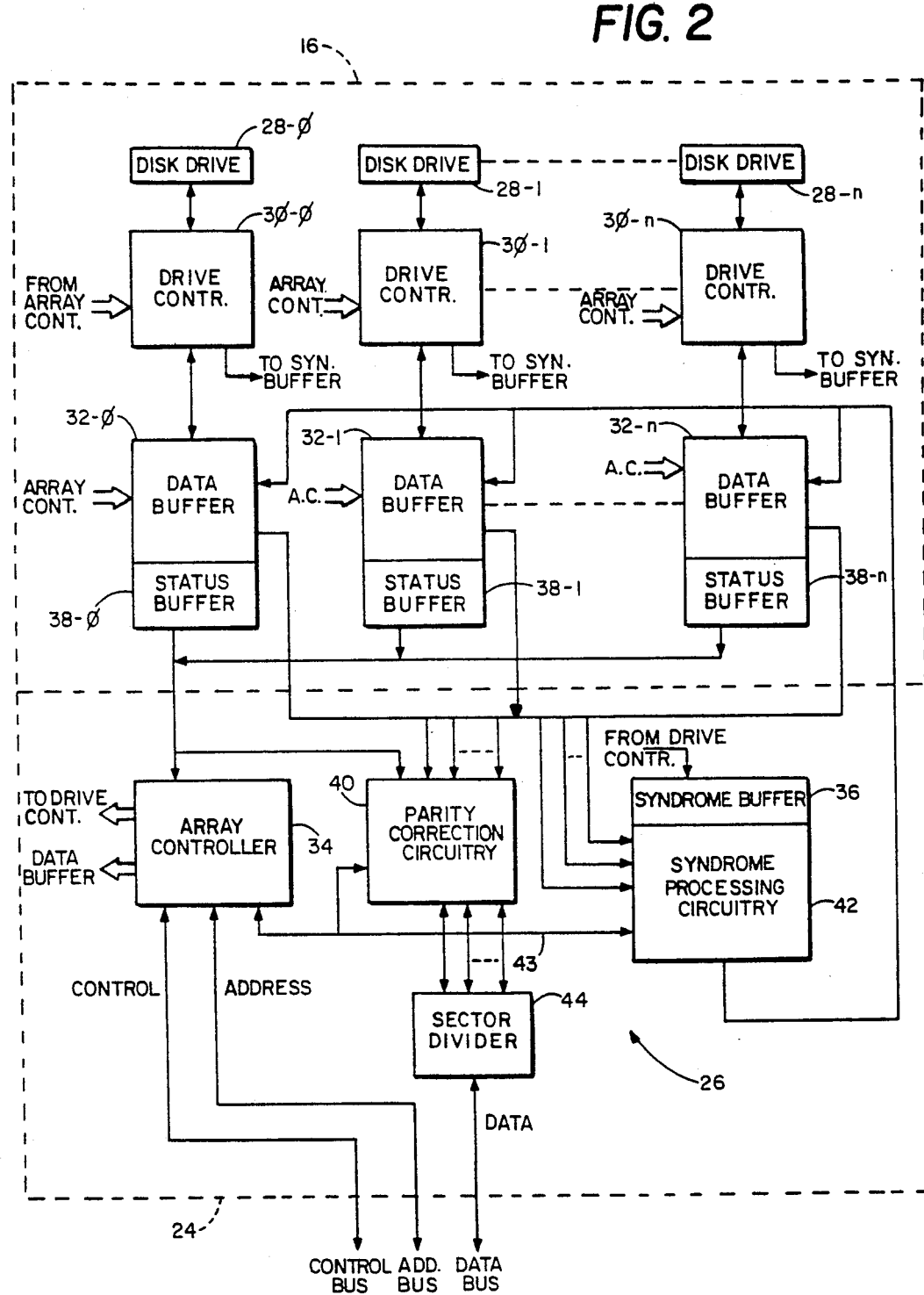
FIG. 2 is a block diagram of the data recovery channel of the present invention.

FIG. 2 illustrates data storage peripheral 16 and an associated input/output peripheral 24 including an improved data recovery channel 26. Data storage peripheral 16 has n+1 disk drives 28-0 through 28-n. Each disk drive is under the direct control of one of n+1 drive controllers 30-0 to 30-n. Drive controllers 30-0 through 30-n, among other functions, provide a passage for data between disk drives 28-0 through 28-n and data buffers 32-0 through 32-n, respectively.

Data records on disk drives 28-0 to 28-n are organized by sectors. A sector includes preamble information, data which is derived from the record applied to peripheral 16 for storage and an error detection and correction code generated from the data. The generation of such sectors and the operation of writing the sectors to drives 28-0 through 28-n forms no part of present patent. The sectors stored on disk drives 28-0 to 28-(n−1) contain the data received over data bus 18 for storage and are referred to here as data sectors. The sectors stored on disk drive 28-n contain parity data related to the data stored in the first n drives and are referred to here as parity sectors. Parity sectors are otherwise like data sectors in that they include error correction codes.

Readback of data records from disk drives 28-0 and 28-n is done simultaneously and in parallel by drive controllers 30-0 to 30-n upon receiving a read command from array controller 34 in interface 26. Groups of sectors, designated here as rows, are interrelated. A row includes a plurality of data sectors, one from each disk, and a parity sector. The parity data in the parity sector are generated from logically associated bits in the data sectors. For example, the first parity bit in the parity sector may be parity for the first data bit from each data sector, the second parity bit in the parity sector is calculated over the second data bits of the data sectors and so on. The sectors of a row are stored to the same logical addresses in data buffers 32-0 to 32-n. During execution of a read back of data records, disk drive controllers 30-0 to 30-n operate on the recovered data and ECC to generate error syndromes for each sector. The error syndromes, if nonzero, are loaded into known locations in an error syndrome buffer 36 for possible later use. A nonzero error syndrome set for a sector indicates presence of a code error in the sector, which may or may not be correctable using the error syndromes. Drive controllers 30-0 to 30-n also monitor disk drives 28-0 through 28-n for indications of drive failure or fault.

A data record includes a plurality of rows of sectors. During readback of a record from disk drives 28-0 to 28-n by drive controllers 30-0 to 30-n, the drive controllers generate error status indications for each sector read and store the error status indications in status buffers 38-0 through 38-n. An error status indication of 0,0 indicates a sector free of detected error; an error status indication of 0,1 indicates a sector for which non-zero error syndromes were generated upon readback; an error status record of 1,0 indicates occurrence of a disk fault. An error status record of 1,1 is not used in the preferred embodiment. In summary, the first digit of the records is used to indicate a disk fault and the second digit is used to indicate a code fault in a sector.

Upon completion of reading of the sectors from disk drives 28-0 through 28-n, the data from each data and parity sector will be stored to a predetermined location in data buffers 32-0 through 32-n, an error status indication for each data and parity sector will be stored to a logically associated address in status buffers 38-0 through 38-n, and the non-zero error syndromes for each sector having code errors will be stored in syndrome buffer 36.

Array controller 34 is a programmed microcomputer. Array controller 34 controls the error correction processing in data recovery channel 26 by monitoring status buffers 38-0 to 38- and communicating with syndrome processing circuitry 42 over bus 43. Data recovery channel 26 includes parity correction circuitry 40, error syndrome buffer 36, error syndrome processing circuitry 42 and data buffers 32-0 to 32-n. Error syndrome processing circuitry 42 may be and preferably is combined with array controller 34 by programming the array controller to perform the functions of the error syndrome processing circuitry. Illustration of array controller 34 and syndrome processing circuity 42 as separate components is an aid to understanding and a feasible hardware configuration.

During a read operation, array controller 34 monitors the error status records stored to error status buffers 38-0 to 38-n. A read operation is allowed to continue as long as no more than one drive fault error occurs in any given row of the recovered record, i.e. the read operation continues as long as the error status 1,0 does not repeat at the same logical address across status buffers 32-0 to 32-n. Where two drive faults are indicated for a row, the read is aborted and extraordinary recovery techniques may be employed, such as a reread attempt or an attempted recovery of the drive. If all such techniques fail the read operation is aborted and a drive array failure condition is indicated.

Absent indication of simultaneous drive faults for two or more disk drives 28, the read operation continues until completion of recovery of an entire record. Array controller 34 then directs error correction for the recovered record, row by row. As previously noted, both operation on parity data and on the error syndromes is available. Array controller 34 interrogates the error status words for a row and determines the number of sectors for which drive fault and ECC error is present. Where error of either type is indicated as occurring in none or only one sector for the row, all of the sectors of the row are transferred from buffers 32-0 through 32-n to parity correction circuitry 40 for correction, if required, through sector divider 44 for reconstruction of the original words of the record and transmission out to data bus 18. Parity correction provides superior speed over a syndrome operation for correction of a sector, therefore it is not even determined whether a sector having error is correctable using the syndromes. Array controller 34 indicates to parity correction circuitry 40 the sector having error. Correction involves the regeneration of the data contained in the sector having error from the remaining data and parity information.

Where positive error status indications exist for two or more sectors of a row, utilization of the error syndromes for correction of one or more sectors is attempted. Array controller 34 first locates those sectors having code errors, indicated in status buffers 38-0 through 38-n by 0,1 records for each sector. Array controller 34 then directs syndrome processing circuitry 42 to analyze the error syndromes for a given sector, typically beginning with the error syndromes for the first sector for which an error status of 0,1 exists. By "first" will typically be meant the sector associated with the lowest numbered data buffer (e.g. 32-1 before 32-3).

The first operation performed by syndrome processing circuitry 42 is a determination whether the error syndromes for a sector can be used to correct the data. If error is correctable syndrome processing circuitry 42 corrects the data in the appropriate data buffer 32-k. Array controller 34 resets the status buffer of the associated error status word to indicate no error in the sector. Array controller 34 will continue correction of sectors using error syndromes, if possible, until only one defective sector remains for a row. When only one error containing sector remains, regardless of whether the error can be corrected using error syndromes or not, the entire row is transferred to the parity correction circuitry 40 for parity correction of the sector containing error. The corrected row is then transmitted to sector divider 44 for reconstruction of the original words of the data record and onto the data bus 18. Array controller 34 then advances the correction algorithm to the next row. Correction continues until all sectors of the file are corrected and transmitted onto data bus 18.

Should two or more sectors of a row have massive errors, i.e. error exceeding the capacity of the error syndromes, correction by array controller 34 is not attempted. Instead, recovery is aborted and the data from at least one of the affected disk drives 28 is reread. Numerous conventional data recovery methods may be attempted, before the recovery attempt is aborted.

The original data words of a record are reassembled before transmission on bus 18. Sector divider 44 is a two-directional element which receives data words over bus 18 and routes each subsequent bit or byte of the word to a succeeding disk drive, wrapping around to the first drive after assignment of n bits (or bytes). Sector divider 44 also operates to reassemble the original words when a record is transmitted out of parity correction circuitry 40.

Figure 3:
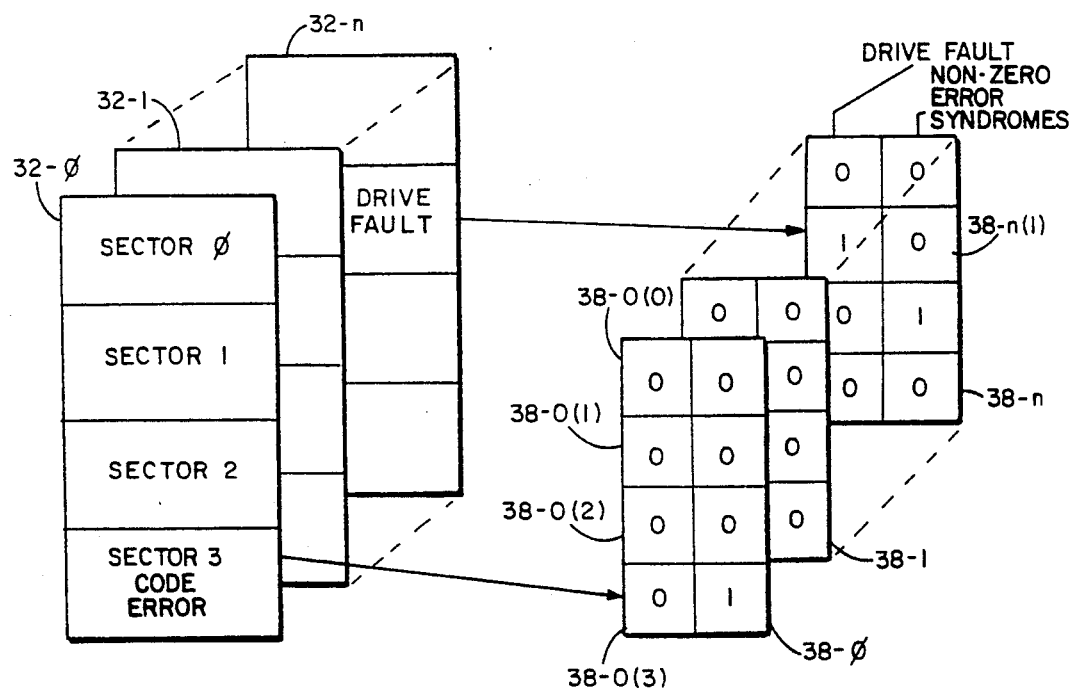
FIG. 3 illustrates organization of the data buffers of the data recovery channel.

FIG. 3 illustrates the storage of an exemplary data record among the memory units comprising data buffers 32-0 to 32-n after recovery of the record from disk drives 28-0 to 28-n. The exemplary record includes $4 \times n$ data sectors, stored four (numbered 0 through 3 for each buffer) to a data buffer, and four parity sectors (numbered 0 to 3) stored in buffer 32-n. Like numbered data and parity sectors belong to a row, e.g. sectors 1 of buffers 32-0 to 32-n are a row, sectors 3 of buffers 32-0 to 32-n are another row. One data bit from each data sector in a row relates to a particular parity bit from the parity sector for the row. In a typical arrangement only the original data of the sector, having bits numbered 0 through 255, are in a buffer after downloading a sector from its disk drive.

Status buffers 38-0 to 38-n consist of storage locations corresponding one for one with each location for sectors to be stored in data buffers 32-0 to 32-n. As recovery of data and parity sectors is attempted from disk drives 28-0 to 28-n and the data or parity transferred to locations in data buffers 32-0 to 32-n, error status indication words for the sectors are generated and stored in the corresponding memory locations of status buffers 38-0 to 38-n. The first bit location of the error status indicator words are the indicators of drive fault, the second bit location of the words are indication of non-zero error syndromes. Initiation of data recovery and transfer in the data buffers, results in all locations of error status buffers 38-0 to 38-n being reset. An error status of 0,0, or reset value, is indication of no error in the corresponding data or parity sector.

Sector 3 stored in buffer 32-0 illustrates indication of non-zero error syndromes for a sector. Status buffer 38-0 has four error status locations 38-0(0) to 38-0(3). The error condition of sector 3 of buffer 32-0 is reflected by the second bit of location 38-0(3) which is set at 1. Similarly, sector 1 of buffer 32-n shows a drive fault error. Location 38-n(1) shows a first bit location as 1 indicating the error condition of the sector.

The present data recovery channel corrects the data of a sector recovered from a disk drive, wherein sectors include error correction codes, groups of sectors are related by the existence of parity data for the group. Two methods of correction for sectors are used, one being parity, the other method using error syndromes. Correction employs the following priority if no more than one sector is lost per group due to drive failure:

(1) Correction of a sector by parity within a parity related group;

(2) Correction of sectors by error correction syndromes until the number of sectors evidencing error in a parity related group is reduced to one, then correcting that sector with parity;

(3) If two or more sectors evidence drive fault and a non-correctable error condition in a parity related group, retrying the read for at least one disk drive;

(4) If the retry read fails, attempting a "Recover" of at least one drive (if disk controller admits the command); and (5) Signalling a data storage peripheral "FAIL" condition if all of the above fail.

Although the present invention has been described with reference to preferred embodiments, workers skilled in the art will recognize that changes may be made in form and detail without departing from the spirit and scope of the invention.

What is claimed is:

1. A data recovery channel in a fault tolerant disk drive array, the disk drive array including a plurality of disk drives and an input interface for receiving data records from a data processing system, the input interface organizing each data record received into data sectors for storage on the disk drives, identifying a plurality of sectors as a related group and generating a parity sector for the group, where each data and parity sector includes an appended error correction code, the groups of data and parity sectors being stored by striping across the available disk drives, the data recovery channel comprising:

a plurality of disk drive controllers each disk drive controller connected to one of the plurality of disk drives, each disk drive controller including:
means for recovering sectors from each disk drive,
means for determining error syndromes for each sector as recovered, and
means for detecting a disk drive fault;

a data buffer connected to each disk drive controller, the data buffer retaining the data and parity recovered with each sector;

an error status buffer connected to the data buffer of each disk drive controller, the error status buffer retaining indication of non-zero error syndromes generated by the disk drive controller upon attempted recovery of a sector and retaining indication of occurrence of a disk fault during attempted recovery of a sector;

an error syndrome buffer, coupled to the disk drive controller, retaining any non-zero error syndromes generated during recovery of data and parity sectors;

syndrome processing means connected to the error syndrome buffer for examining the error syndrome to determine the correctability of the data of a sector, and for correcting the data in the data buffer, if possible;

parity correction means receiving groups of data and corresponding parity information from the data buffer and correcting the data from up to one sector; and an array controller connected to each of the disk drive controllers, the array controller operating upon the error status buffer and indications of correctability of data from the syndrome processing means to direct a correction for each sector of a group.

2. The data recovery channel of claim 1 wherein the array controller further comprises:

means for monitoring the error status buffer;

means for transferring the data and parity for a group of sectors to the parity correction means when a number of errors indicated for a group of sectors is one or less; and means for resetting the status indications for a sector in the error status buffer where analysis of the error syndromes for the sector shows that the data from the sector can be corrected.

3. The data recovery channel set forth in claim 2, wherein each error status buffer has a memory location for each sector recovered of a data record.

4. The data recovery channel of claim 3 wherein the array controller further comprises:

means for initiating a disk read retry when more than one disk fault is indicated for a group; and means for indicating a read failure when a disk read retry fails.

5. The data recovery channel of claim 3 wherein the array controller further comprises:

means for initiating a disk read retry when the number of sectors having a fault cannot be reduced to one in number; and means for indicating a read failure when a disk read retry fails.

6. The data recovery channel as set forth in claim 5, wherein the disk array comprises simultaneously operating disk drive units, each unit being substantially unaffected by faults occurring in other units.

7. A method of correcting errors appearing in data recovered from a plurality of disk drives in an array, wherein the data is organized on the disk by sectors and groups of sectors form related rows, each row having a parity data sector and each sector including an error correction code, the method comprising the steps of:

(a) generating error syndromes for each sector upon recovery of data from the disk drives;

(b) storing non-zero error syndromes for use in correction of data;

(c) generating and then storing error status indications for each sector recovered, the error status indications including a no error condition, a non-zero error syndrome condition and a drive fault condition;

(d) initiating a correction protocol including the steps of, (1) checking an error status for each sector for a row and continuing to a next row of sectors if no errors are present, (2) correcting the sector using parity correction when an error is indicated for one sector and returning to step (1) for the next row of sectors, (3) using the error syndromes to locate sectors correctable with the error syndromes and correcting the data for those sectors until one sector having error is left, when an error is indicated for more than one sector of the row, and then returning to step (2), (4) initiating a retry read of a data storage unit from which a sector having not correctable error was recovered where operation of steps (1) through (3) cannot prevent error from being indicated for more than one sector of the row, and returning to step 1, if the retry read is successful, and (5) indicating a read failure and aborting the data recovery attempt if step (4) is not successful.

8. The method of claim 7 wherein step (d) (4) further comprises a recovery of the data storage unit and returning to step 1, if successful.

* * * * *